United States Patent Office 3,079,284
Patented Feb. 26, 1963

3,079,284
METHOD FOR CLEANING SURFACES
John B. Boucher, Farmington, and Vincent K. McHugh, Detroit, Mich., assignors to Rinshed-Mason Company, Detroit, Mich., a corporation of Michigan
No Drawing. Filed Nov. 30, 1960, Ser. No. 72,562
9 Claims. (Cl. 134—4)

The present invention relates to a method for cleaning, and more particularly, to a method for cleaning adherent residue containing fats from a surface, for example, the interior surface of a cooking oven.

The cleaning of the interior surfaces of household cooking ovens is a difficult, tedious and lengthy task which housewives approach with reluctance. The cleaning compositions presently on the market are difficult to use and are relatively ineffective.

The majority of the oven cleaners presently on the market comprise a 6 to 9% concentration of sodium or potassium hydroxide in water solution. Various amounts of thickening agents are added to this composition to produce the desired consistency. These products are applied by brushing or daubing onto the porcelain interior surfaces of the oven. After they are applied, they are allowed to remain on the oven surfaces for several hours to remove the food residues from the oven. After sufficient time has elapsed, the householder must remove the caustic viscous mass. Removal of this caustic mass presents a problem in that the caustic material is capable of injuring the householder and it is difficult to clean from the surface, requiring laborious scraping and chipping. Frequently, if the oven soil is extensive, the entire cleaning process must be repeated.

Another commonly used method for cleaning oven surfaces involves the use of ammonia vapors to soften the adherent residues. Ammonia may be added to a detergent solution and applied to the soiled areas. Alternatively, a dish of ammonia may be placed in the oven and allowed to remain there for a long period whereupon the ammonia vapors will soften the residues. A third method for applying ammonia vapors is to add water to chemicals which will liberate ammonia funmes when wetted. The use of ammonia vapors is not as effective as the use of lye solutions and, in addition, has the disadvantages of the irritant effect of ammonia vapors on the eyes and skin. Ammonia vapors may also damage painted surfaces and the use of ammonia is dangerous in that the ammonia vapors are inflammable and may explode. Further, the necessity of scraping and chipping is not eliminated.

As a result of the generally unsatisfactory nature of the currently used methods for cleaning the interior surfaces of ovens, there is a need for a new and improved method. We have developed a cleaning composition which is effective and easy to use. While we developed this composition with the cleaning of interior surfaces of cooking ovens in mind, it is obvious that the composition may be used wherever a similar problem is encountered.

It is an object of this invention to provide a method of cleaning adherent organic residue from a surface, the method being particularly effective in removing the food residues and chars from the interior surfaces of cooking ovens.

A further object of the invention is to employ a cleaning agent together with a latex material to cause softening and solubilization of surface residues and chars, the latex acting to hold the cleaning agent in contact with the surface to permit the cleaning action to occur.

The cleaning composition of the present invention comprises essentially of a mixture of a latex and a saponification agent. The composition preferably has from 80 to 95% by weight of the latex and from 5 to 20% by weight of the saponification agent.

Many different latices may be used in the composition. The latex is preferably elastomeric, that is, an emulsion of a polymeric rubber-like material. However, any latex which will form a strippable film may be used. Useful latices are, for example, styrene-butadiene, butadiene, plasticized polyvinyl acetate, butyl acrylic, and mixtures of these. Butyl rubber latex is the preferred latex in terms of the film properties obtained.

The cleaning agent is a material capable of saponifying the food residue or other fat material which is in adherent contact with the surface to be cleaned. The term "saponification" is meant to include any hydrolysis. Suitable saponifying agents are the alkalies. A caustic material such as sodium hydroxide and potassium hydroxide has been found to give superior results. Numerous amines and other basic compounds have also been found to be useful as saponifying agents. Amines which have proved useful by themselves or in conjunction with an alkali metal hydroxide or other caustic materials are tetramethyl guanidine, trishydroxymethylaminomethane, diisopropylamine, 2,6-dimethyl morpholine, monoisopropanolamine, tetraethylene pentamine, diamylamine, triamylamine. Ammonia is also effective but only when the composition is used in closed areas because ammonia is extremely volatile. The use of amines and ammonia has the disadvantage that the vapors from these materials are irritants, have an unpleasant odor, and are dangerous due to their flammability.

Vulcanizing agents may be included in the composition to give improved strength to the film formed by the latex. However, the use of a vulcanizing or other curing agents is not essential to the composition as the film strength without these agents is satisfactory.

Various surface active agents, such as soap, when added to the latex prior to the addition of the saponifying agent reduce the tendency of the latex to coagulate upon addition of the cleaning agent. Examples of useful surface active agents are potassium oleate, sodium oleate, salts of sulfated alcohols such as alkylphenoxypoly (ethyleneoxy) ethanol, and sodium isopropylnaphthalene sulfonate.

Thickening agents may also be used to permit viscosity control and to stabilize the mixture. Useful thickening agents are carboxymethyl cellulose, carbowax and hydroxyethyl cellulose.

Mineral fillers when added to the composition give aded film strength. Useful mineral fillers are magnesium silicate, colloidal silicas, diatomaceous silica, and asbestos fibers. Asbestos fibers are preferred.

Various examples of useful composition are set forth below, but these are merely exemplary of the invention and are not intended to be limitations thereof.

*Example I*

Parts by weight
Butyl rubber latex (containing 55% solids in water) 100
50% sodium hydroxide solution in water _____ 10

Example I is an illustration of the basic composition, containing only a latex and a cleaning agent. When this mixture was applied to a porcelain panel having baked and charred cottonseed oil thereon, air dried for 15 minutes, heated to 180° F. for one hour, and then allowed to cool, an elastomeric film developed which was easily peeled off in one piece leaving the porcelain clean except for a soapy residue which was sponged off leaving a clean shiny surface. During heating, the mixture became discolored by the solubilized charred residues.

*Example II*

Parts by weight
Butyl rubber latex of Example I _____ 100
Vulcanizing agent _____ 5
50% sodium hydroxide solution in water _____ 10

The vulcanizing agent was prepared as follows:

| | Parts by weight |
|---|---|
| Zinc oxide | 50 |
| Sulfur | 40 |
| Water | 86 |
| Sodium salt of condensed aryl sulfonic acid | 1 |

The vulcanizing agent was added to the latex with mixing and then the sodium hydroxide solution was added and dispersed in the mixture. The resultant film-forming emulsion was applied to a soiled panel, air dried, heated and cooled as in Example I. Excellent cleaning results were obtained upon stripping the film and wiping the surface. The film strength was improved over Example I, and the film was more easily stripped from the surface.

*Example III*

| | Parts by weight |
|---|---|
| Butyl rubber latex of Example I | 50 |
| Potassium oleate | 2 |
| Sodium isopropylnaphthalene sulfonate | 5 |
| 50% potassium hydroxide solution in water | 15 |

The butyl latex and surface active agents were mixed together and then the potassium hydroxide solution was added slowly with stirring. The resultant composition was considerably more resistant to coagulation than a similar composition without the surface active agents. When applied to a surface, its cleaning ability and film strength were comparable to the previous examples.

*Example IV*

| | Parts by weight |
|---|---|
| Butyl rubber latex (55% solids) | 50 |
| Sodium salt of sulfated alkylphenoxypoly (ethyleneoxy)ethanol | 5 |
| Hydroxyethyl cellulose | 1 |
| 50% solution of sodium hydroxide in water | 15 |

The latex, surface active agent and thickening agent were first mixed together and then the sodium hydroxide solution was added slowly with stirring. This composition has a higher viscosity than the compositions without the thickening agent and has less tendency to sag on application to vertical surfaces. The cleaning action of this composition is substantially equal to that of the previous examples.

*Example V*

| | Parts by weight |
|---|---|
| Butyl rubber latex (55% solids) | 50 |
| Potassium oleate | 2 |
| Sodium isopropylnaphthalene sulfonate | 5 |
| Asbestos fibers | 7 |
| 35% solution of potassium hydroxide in water | 23 |

The latex, surface active agents and asbestos fibers were first mixed together (the fibers being first thoroughly wetted with water). The potassium hydroxide solution was then added slowly with stirring. This composition gives films of greater strength than those without the filler. The increased film strength aided removal of the film after the surface has been cleaned and the cleaning action was satisfactory.

*Example VI*

| | Parts by weight |
|---|---|
| Butyl rubber latex (55% solids) | 50 |
| Potassium oleate | 2 |
| Sodium isopropylnaphthalene sulfonate | 2 |
| 50% solution of tetramethyl guanidine in water | 20 |

This mixture was prepared similarly to the previous mixtures. As will be noted, the cleaning agent has been changed from the general class used in the previous examples. However, the results were still satisfactory. When this composition was applied over a porcelain surface having charred food residues thereon, heated for 15 minutes at 150° F. and then cooled, a film formed which was stripped off easily leaving a soapy residue which was readily removed with water.

*Example VII*

| | Parts by weight |
|---|---|
| Polymethylmethacrylate latex (65% solids) | 50 |
| Potassium oleate | 5 |
| Water | 5 |
| 50% solution of sodium hydroxide in water | 20 |

This composition was mixed as in the previous examples and formed a stable viscous gel. When applied to a porcelain panel and baked for 10 minutes at 130° F. it gave an elastomeric strippable coating which was somewhat lower in tensile strength than the butyl latex films. However, the film is satisfactory as is the overall cleaning ability of this composition.

The method for using the composition of the present invention comprises first applying a coating of the composition to a surface having adherent food residue or other fat material thereon. The coating may be applied in any desired way as by brushing or spraying. The most troublesome surfaces to clean, and the surfaces upon which this composition is particularly useful, are the interior surfaces of a cooking oven. However, the composition may be applied to any surface having fat or organic residues baked or hardened thereon. For example, a similar problem is encountered in connection with rotisseries, electric broilers, and the various places associated with gas and electric stoves and also in the mechanical arts where grease and other such material becomes hardened on a surface.

Once the composition has been applied, it must be allowed to dry or adhere to form a film which may be stripped from the surface. Contact must be maintained between the coating and the surface until the cleaning agent has softened, loosened and merged the major portion of the residues into the film. This process may be accelerated by subjecting the coating to an elevated temperature. However, the coating may be allowed to air dry if desired. If the coating is allowed to air dry, a longer time, for example, from six to eight hours, is required before sufficient film strength is developed to provide a strippable film. Cycles as low as 10 to 15 minutes may be used if the temperatures are at 200° F. or higher. Lower temperatures such as 125° F., will of course require longer periods (30 minutes to 1 hour) for the water to vaporize and leave a strippable film. Temperatures above 250° F. should be avoided as they may produce a scorching effect, making the peeling of the film difficult.

Another advantage to the use of elevated temperatures is that, in addition to accelerating the hardening of the film-forming material, the heat also increases the efficiency of the chemical reaction of the cleaning agent with the soil to be removed, e.g. the saponification of charred fats, or the like. The increased efficiency of the cleaning agent inherently permits the use of lower concentrations of such agents in the composition and insures effective chemical reaction within the film-forming period. Currently marketed cleaning compositions are not capable of being heated after being applied. In addition to the cost of the agents, the use of larger amounts creates a severe problem of skin irritation to the user.

After the strippable film has been formed and the food residues have been absorbed into the film, the film may be stripped from the surface. The stripping operation is quite simple, and the film will usually come off in large pieces. Normally, the film may be stripped from an entire surface in one unit. When the film has been removed, there is a soapy residue on the surface in which any remaining soil is suspended and which may be easily wiped off to leave the desired clean surface.

Having thus described our invention, we claim:

1. The method for cleaning food residue from a surface which comprises first applying a coating of a cleaning composition to the surface; said composition comprising an elastomeric latex and a saponification agent; retaining coating-surface contact until the coating forms into a continuous strippable film; and then stripping the film from the surface in relatively large pieces.

2. The method for cleaning food residue from a surface which comprises first applying a coating of an elastomeric latex containing a caustic material on the surface; maintaining contact between the coating and the surface until the caustic material has reacted with the food residue and the latex has hardened into a continuous strippable film; and then stripping the film from the surface in relatively large pieces.

3. The method of claim 2 and further characterized in that after the coating has been applied, the temperature thereof is elevated to accelerate the action of the caustic material and the formation of a strippable film.

4. The method for cleaning adherent organic residue from a surface which comprises first applying a coating of a latex containing a saponifying and cleansing agent on a surface having adherent organic residue thereon; simultaneously saponifying the residue and curing the latex into a continuous strippable film; and then stripping the film from the surface in relatively large pieces.

5. The method for removing adherent fat residue from a surface which includes first applying a coating of a film-forming material having contained therein a softening and saponifying material on a surface having adherent fat residue thereon; heating the coating to simultaneously soften and saponify the residue and harden the film-forming material to form a continuous strippable film; and then stripping the film from the surface in relatively large pieces.

6. The method for cleaning adherent residue from a surface which comprises first applying a coating of a latex containing a cleaning agent therein onto a surface having adherent residue thereon; maintaining contact between the coating and the surface while subjecting the coating to an elevated temperature up to 250° F. until the residue has been dissolved and the latex forms into a continuous strippable film, and then stripping the film from the surface in relatively large pieces.

7. The method for cleaning a surface which comprises first applying a coating of an elastomeric latex containing a cleaning agent therein onto a surface; hardening the latex coating into a self-sustaining continuous strippable film with the cleaning agent in situ; and then stripping the film from the surface in relatively large pieces.

8. The method of claim 7 and further characterized in that after the coating has been applied, the temperature thereof is elevated to accelerate the formation of a strippable film.

9. In a method of removing adherent charred fatty residues from an oven surface, the steps of applying directly to the oven surface and any residue thereon a coating consisting essentially of from 80 to 95% by weight of an aqueous emulsion of an elastomeric film-forming material and from 5 to 20% by weight of a saponifying agent, simultaneously at least partially saponify the residue and curing the elastomeric material to a self-sustaining continuous strippable film, and stripping the film and any adherent residue from the surface in relatively large pieces.

References Cited in the file of this patent

UNITED STATES PATENTS

| | | |
|---|---|---|
| 1,533,326 | Marshall et al. | Apr. 14, 1925 |
| 1,565,536 | Wandel | Dec. 15, 1925 |
| 1,909,200 | Livingston et al. | May 16, 1933 |
| 2,367,918 | Bartel | Jan. 23, 1945 |
| 2,455,854 | Conde | Dec. 7, 1948 |
| 2,455,856 | Murphy et al. | Dec. 7, 1948 |
| 2,495,729 | Hudson et al. | Jan. 31, 1950 |
| 2,611,153 | Semegen | Sept. 23, 1952 |
| 2,615,820 | Schwoegler | Oct. 28, 1952 |
| 2,913,429 | Floria et al. | Nov. 17, 1959 |
| 3,003,897 | Schwartz | Oct. 10, 1961 |

FOREIGN PATENTS

| | | |
|---|---|---|
| 23,345 | Australia | June 17, 1930 |